Inventor
JAMES NEVILLE BRADE

By Morris + Bateman
Attorney

Inventor
JAMES NEVILLE BRADE

By Norris + Bateman

Attorney

· # United States Patent Office 3,374,610
Patented Mar. 26, 1968

3,374,610
MOWING MACHINES
James Neville Brade, Churchtown, Southport, England, assignor to Harrison, McGregor and Guest Limited
Filed Nov. 16, 1964, Ser. No. 411,481
Claims priority, application Great Britain, Nov. 23, 1963, 46,332/63
12 Claims. (Cl. 56—25)

ABSTRACT OF THE DISCLOSURE

A tractor-mounted mowing machine having a hydraulic motor for reciprocating the knife-bar and a hydraulic jack for raising the machine out of work is so constructed and arranged that the motor and jack are connectible in series in a pressurized hydraulic circuit to pass the whole hydraulic oil flows through the motor while the machine is being raised and thus minimize the risk of jamming of the knife-bar by crop material during raising of the machine. A valve is provided in the circuit selectively movable between a position to establish the series connection and another position wherein the oil flow bypasses the jack. The jack includes a high pressure relief valve.

---

The invention relates to mowing machines of the reciprocating knife-bar type for mounting on agricultural tractors.

Mowing machines are known in which the knife-bar is driven by a hydraulic motor and the machine is raised by a hydraulic jack, the motor and jack being supplied with oil by a pump on the tractor. In the known machines, the hydraulic jack and the hydraulic motor are connected hydraulically in parallel, such that when drive is being transmitted to the knife-bar and the hydraulic jack is actuated a large proportion of the oil supplied by the hydraulic pump on the tractor is temporarily delivered directly to the jack and the volume of oil delivered to the hydraulic motor is consequently reduced. As a result it frequently happens that whilst the hydraulic motor is temporarily starved of oil the knife-bar becomes jammed by crop material. This necessitates the tractor driver stopping the machine and dismounting from the tractor in order to free the knife-bar.

The object of the present invention is to overcome this disadvantage.

According to the invention, a mowing machine of the reciprocating knife-bar type, for mounting on an agricultural tractor, comprises a hydraulic motor connected drivably to the knife-bar and connected hydraulically in series with a hydraulic jack for raising the machine.

A preferred embodiment of the invention will now be described, by way of example only, with reference to the accompanying drawings of which:

FIG. 5 is a front elevation of a lever mechanism hereinafter referred to.

Figure 2:
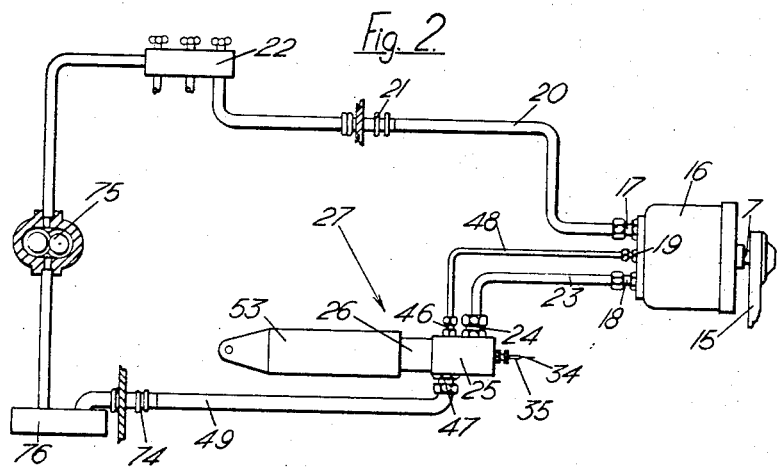
FIG. 2 is a diagrammatic view of the hydraulic system.

Referring now to the drawings, a mowing machine comprises a conventional knife-bar 12 reciprocable on a bed 9 pivotally connected to a frame 10 about an axis 11. The frame is adapted to be mid-mounted on an agricultural tractor at three points of attachment disposed at the respective apices of a triangle. The knife-bar 12 is connected by a link 8 to the lower end of a lever 13 pivotally mounted between its ends on the frame 10 about an axis 14. The upper end of the lever 13 is connected to one end of a pitman arm 15 the other end of which is mounted on a crank pin 7 (see FIG. 2) driven by a gear-type hydraulic motor 16. The hydraulic motor is provided with three hydraulic connections 17, 18 and 19. A flexible conduit 20 provided with a quick-release self-sealing coupling 21 extends from the connection 17 to one of the outlets on a three-way valve 22 forming a conventional part of a tractor hydraulic power lift mechanism having also a pump 75 drawing oil from a sump 76. Another flexible conduit 23 extends from the connection 18 to a connection 24 provided on the exterior of a valve body 25 formed at the outer end of the ram 26 of a single acting hydraulic jack 27. The ram 26 is connected resiliently to the frame 10 by means of a bracket 28 fixed to the frame, a part-spherical seat 29, an annular rubber pad 30, and an end cover 31 secured to the ram by bolts 6 (see FIG. 3).

A spool valve 32 contained within a bore 33 formed in the valve body 25 is slidable in said bore by means of a wire 34 slidable within a flexible casing 35. A spring 36 surrounding the wire 34 abuts against one end of the spool valve 32 and against the end cover 31 to urge the spool valve into the position shown in FIG. 3.

Figure 4:
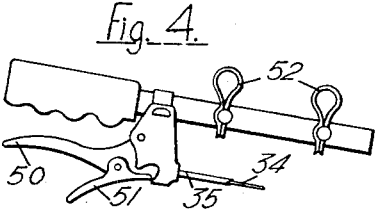
FIG. 4 is a side elevation of means for operating the control valve shown in FIG. 3.

The spool valve 32 is provided with two portions 37 and 38 of reduced diameter which co-act with two annular grooves 40 and 41 formed in the bore 33. The spool valve 32 is a composite valve and houses an axially disposed relief valve 42 which communicates on its inlet side with the portion 38 by way of a diametrical bore 43 and on its outlet side with the portion 37 by way of a diametrical bore 44. The connection 24 on the exterior of the valve body 25 is in constant communication by way of a port 72 with the annular groove 40. Also in constant communication with said groove, by way of a port 73, is a drilling 45 which extends into a bore 39 formed at the opposite end of the ram 26 to the valve body 25 and opening into the cylinder 53 of the hydraulic jack 27. Two circumferentially spaced connections 46 and 47 are in constant communication with the annular groove 41, and a drain conduit 48 conducts oil seepage within the motor 16 from the connection 19 to the connection 46. A return conduit 49 provided with a quick-release self-sealing coupling 74 extends from the connection 47 to the sump 76. A drilling (not shown) is provided in the valve body 25 to connect the two spaces at the respective ends of the bore 33, so as to obviate any hindrance to movement of the spool valve 32 due to air and possible oil seepage being locked in each space. A hand lever 50 (see FIG. 4), for sliding the wire 34 within the casing 35 and provided with a locking lever 51, is secured to the tractor adjacent the driver's seat by means of spring clips 52.

Figure 5:
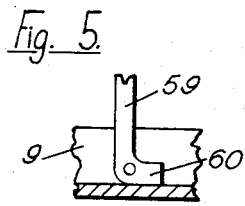

The cylinder 53 is pivotally connected to one arm of the bell-crank lever 54 which is pivotally mounted on the frame 10. The other arm of the bell-crank lever 54 is connected to the lower end of the short length of chain 55 the upper end of which is removably secured to the tractor by means of a stud 56 and a linchpin 57. Said one arm of the bell-crank lever 54 is connected by means of a rod 58 and a lever 59 to the bed 9 of the knife-bar 12. The lever 59 is pivotally mounted on the bed 9 and is provided on its lower end with a foot 60 (see FIG. 5). Movement of the lever 59 about its pivot in a clockwise direction as viewed from the front of the machine, that is to say as viewed in FIGS. 1 and 5, causes the foot 60 of said lever to lift the bed 9 and knife-bar 12 relative to the frame 10, but movement of the bed and knife-bar in a clockwise direction relative to the lever 59 is freely permitted.

Another point of attachment to the tractor is formed by pitch control means 61 for the mowing machine. Said means comprise a length of round bar 62 provided with a diametrical hole 63, said bar having upper and lower portions with mutually inclined intersecting axes. The upper portion is adapted to be clamped to a bracket 71 secured rigidly to the tractor, and the lower portion extends through a sleeve (not shown) provided with two diametrically opposed radially projecting pegs 64. Said sleeve is clamped lightly between a flange 65 formed on the lower portion of the length of round bar 62 and a washer secured by an axial bolt to the extreme lower end of said bar. The two pegs 64 extend through aligned holes in the frame 10 and form an axis about which the frame is pivotable by the hydraulic jack 27.

The front end of a strut 66 is connected to the frame 10 by means of a ball joint 67, and the rear end of said strut is adapted to be connected by means of a ball joint 77 to the tractor rear axle casing. The strut 66 forms the third point of attachment of the mowing machine to the tractor. Said strut is a spring-loaded telescopic structure adapted to collapse if the machine meets with an obstruction or other overload.

Figure 1:
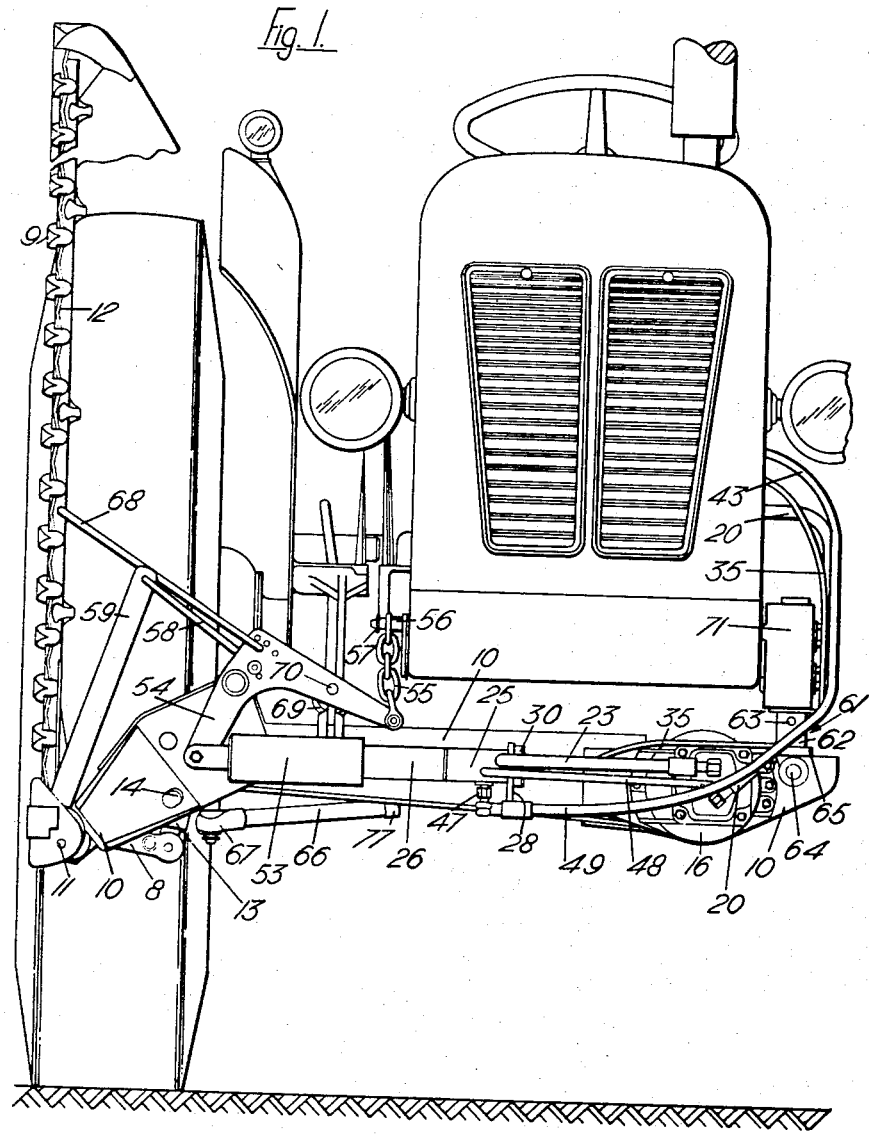
FIG. 1 is a front elevation of a mowing machine according to the invention mounted in transport position on a tractor, parts of the tractor, notably the front axle and front wheels having been omitted for clarity.

A removable stay 68 which is connectable between the bell-crank lever 54 and the bed 9 of the knife-bar 12 is provided to support said bed when it is in transport position (see FIG. 1). A single chain link 69 pivotally connected to the frame 10 and a pin 70 secured to the bell-crank lever 54 are so positioned that when the machine is fully raised by the hydraulic jack 27 the link 69 can be placed over the pin 70 to hold the frame in raised position when the supply of oil under pressure to the hydraulic jack 27 is discontinued.

The operation of the mowing machine is as follows:

The machine is attached to a tractor at the three points hereinbefore referred to, and the pitch of the machine is set to suit the operating conditions by inserting a rod in the hole 63 and using said rod to rotate the length of round bar 62 until the desired angle of attack of the knife-bar 12 relative to the ground is obtained. The length of round bar 62 is then clamped to the bracket 71 and to the sleeve provided with the pegs 64. The hand lever 50 is secured to the tractor by means of the spring clips 52, and the conduits 20 and 49 are connected to their respective couplings 21 and 74.

Figure 3:
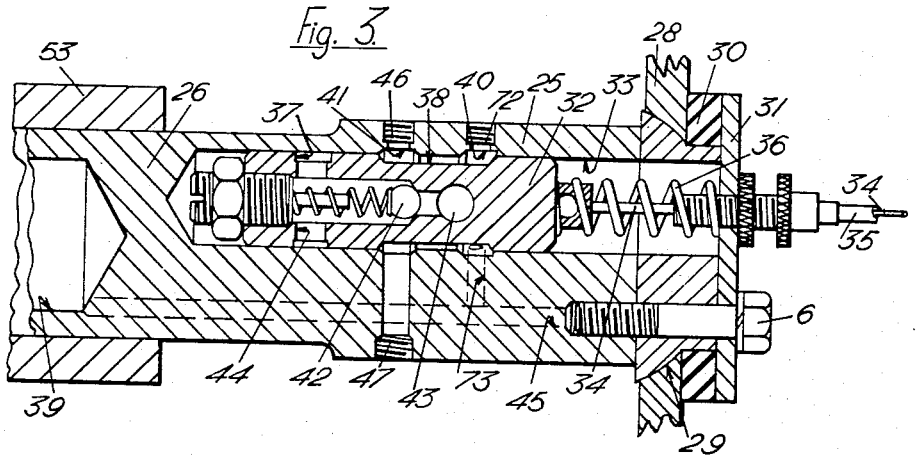
FIG. 3 is a sectional view on a larger scale, of a control valve on the mowing machine.

When it is desired to move off, the mowing machine is lifted clear of the ground by opening the appropriate outlet of the three-way valve 22, actuating the hand lever 50 to move the spool valve 32 to the right of the position shown in FIG. 3 until the portion 37 of reduced diameter is aligned with the annular groove 41, and locking the hand lever 50 by means of the lever 51. Thus oil from the pump 75 passes through the conduit 20 to the motor 16 and thence through the conduit 23, the connection 24, the port 72, the annular groove 40, the port 73 and the drilling 45, to the interior of the cylinder 53. The oil also communicates with the closed relief valve 42 by way of the portion 38 of reduced diameter (which is aligned with the annular groove 40) and the diametrical bore 43. The knife-bar 12 commences to reciprocate, and the hydraulic jack 27 extends thereby pivoting the bell-crank lever 54 which causes the frame 10 to pivot upwardly about the pegs 64 and simultaneously causes the knife-bar 12 to pivot upwardly relative to the frame 10 about the axis 11. When the hydraulic jack 27 is fully extended, pressure builds up within it and opens the relief valve 42. The machine is held clear of the ground and oil from the conduit 23 flows to the sump 76 by way of the non-return valve, the diametrical bore 44, the portion 37 of reduced diameter, the annular groove 41 aligned with said portion, the connection 47 and the return conduit 49.

When it is desired to lower the knife-bar 12 to commence cutting the crop the locking lever 51 is tripped by the tractor driver and the spool valve 32 is returned by the spring 36, to the position shown in FIG. 3, thus allowing oil to escape from the cylinder 53 to the sump 76 by way of the drilling 45, the port 73, the portion 38 of reduced diameter, the connection 47 and the return conduit 49. The oil discharged by the hydraulic motor 16 into the conduit 23 flows through the connection 24 and the port 72 to the portion 38 of reduced diameter and thence to the sump 76 along the same path as the oil escaping from the cylinder 53.

Due to the hydraulic jack 27 being connected in series with the hydraulic motor 16, the supply of oil to the motor cannot be reduced when the jack is operated to raise the machine, as the oil supplied to the jack must first pass through the motor.

If, in operation, the knife-bar 12 meets with an obstruction or is overloaded by a very dense patch of crop, the telescopic strut 66 collapses whereupon the machine pivots rearwardly relative to the tractor about the lower portion of the length of round bar 62, the sleeve provided with the pegs 64 being clamped to said portion sufficiently lightly to enable relative movement to occur in these circumstances.

Extension of the hydraulic jack 27 only pivots the bed 9 relative to the frame 10 through a small angle, and the bed must therefore be raised manually into its generally vertical transport position. As previously mentioned, movement of the bed 9 relative to the lever 59 in a clockwise direction as viewed from the front of the machine is freely permitted. This enables the bed 9 to be raised manually into its transport position, and also enables the machine to cut a crop growing on a banking which is inclined relative to the ground on which the tractor is running. When the bed 9 is to be raised into transport position, the hydraulic jack 27 is actuated and the chain link 69 is placed over the pin 70. The outlet from the three-way valve 22 to the conduit 20 is closed, whereupon the knife-bar 12 ceases to reciprocate and the bed 9 can be raised by the driver into its transport position where it is secured by the stay 68.

In a modification, the gear-type hydraulic motor 16 is replaced by any other type of hydraulic motor having a rotary output shaft.

What I claim is:

1. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack mounted on the frame and operably connected for raising the frame, conduit means in said hydraulic circuit connecting the hydraulic motor and the hydraulic jack in series so that substantially all the hydraulic fluid passing through said motor passes in turn through said jack, and control means for said circuit.

2. A movably mounted mowing machine comprising a frame, a knife-bar bed hinged to the frame, a knife-bar reciprocable on the bed, a rotary hydraulic motor mounted on the frame and drivably connected to the knife bar, a hydraulic circuit containing a pump and conduit means for supplying hydraulic fluid under pressure to said motor, a single-acting hydraulic jack mounted on said frame and operably connected for raising the frame, conduit means in said hydraulic circuit connecting the hydraulic motor and the hydraulic jack in series so that substantially all the hydraulic fluid passing through said motor passes in turn through said jack, a flow path by-passing the jack, and a manually operable valve operable to selectively provide said series connection or to direct fluid flow from the motor into the flow path.

3. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting mounted hydraulic jack mounted on the frame and operably connected for raising the frame, conduit means in said hydraulic circuit connecting the hydraulic motor and the hydraulic jack in series so that substantially all the hydraulic fluid passing through said motor passes in turn through said jack, control means for said circuit, means providing a flow path by-passing the jack, a valve movable between a position providing said series connection and a position directing fluid flow from the motor into the flow path, a hand lever and a motion transmitting wire slidable in a flexible casing and connected between the valve and the hand lever.

4. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack mounted on the frame and operably connected for raising the frame, a conduit means in said hydraulic circuit connecting the hydraulic motor and the hydraulic jack in series so that substantially all the hydraulic fluid passing through said motor passes in turn through said jack, a control means for said circuit, means defining a flow path by-passing the jack, a manually operable valve operable to selectively provide said series connection or direct fluid flow from the motor into the flow path, and a high pressure relief valve for the jack.

5. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack mounted on said frame and operably connected for raising the frame, conduit means in said hydraulic circuit connecting the hydraulic motor and the hydraulic jack in series so that substantially all the hydraulic fluid passing through said motor passes in turn through said jack, control means for said circuit, means defining a flow path by-passing the jacks, a manually operable valve operable to selectively provide said series connection or direct fluid flow into the flow path, and a high pressure relief valve for the jack operable when said series connection is provided, the relief valve being located in a passage through the manually operable valve.

6. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack mounted on the frame, means for connecting the jack to a tractor mounting the machine for raising the machine relative to the tractor, conduit means in said hydraulic circuit connecting the hydraulic motor and the hydraulic jack in series so that substantially all the hydraulic fluid passing through said motor passes in turn through said jack, and control means for said circuit.

7. The mowing machine defined in claim 6, wherein said jack is flexibly connected to said bed.

8. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack mounted on the frame, a bell-crank lever pivotally mounted on the frame, one arm of the lever being operably connected to the jack, means for connecting the other arm of the lever to a tractor mounting the machine, conduit means in said hydraulic circuit connecting the hydraulic motor and the hydraulic jack in series so that substantially all the hydraulic fluid passing through said motor passes in turn through said jack, and control means for said circuit.

9. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack mounted on the frame, a bell-crank lever pivotally mounted on the frame, one arm of the lever being operably connected to the jack, means for connecting the other arm of the lever to a tractor mounting the machine, a linkage connecting the bell-crank lever to the bed, conduit means in said hydraulic circuit connecting the hydraulic motor and the hydraulic jack in series so that substantially all the hydraulic fluid passing through said motor passes in turn through said jack, and control means for said circuit.

10. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack resiliently mounted at one of its ends on the frame, a bell-crank lever pivotally mounted on the frame, one arm of the lever being pivotally connected to the other end of the jack, means for connecting the other arm of the lever to a tractor mounting the machine, a linkage connecting the bell-crank lever to the bed, conduit means in said hydraulic circuit connecting the hydraulic motor and the hydraulic jack in series so that substantially all the hydraulic fluid passing through said motor passes in turn through said jack, and control means for said circuit.

11. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack mounted on the frame, a bell-crank lever pivotally mounted on the frame, one arm of the lever being operably connected to the jack, a chain for connecting the other arm of the lever to a tractor mounting the machine, a linkage connecting the bell-crank lever to the bed, conduit means in said hydraulic circuit connecting the hydraulic motor and the hydraulic jack in series so that substantially all the hydraulic fluid passing through said motor passes in turn through said jack, and control means for said circuit.

12. A movably mounted mowing machine comprising a frame, a knife-bar bed hinged to the frame, a knife-bar reciprocable on the bed, a rotary hydraulic motor mounted on the frame and drivably connected to the knife-bar, a hydraulic circuit containing a pump and conduit means for supplying hydraulic fluid under pressure to said motor, a single-acting hydraulic jack resiliently mounted at one of its ends on the frame, a bell-crank lever pivotally mounted on the frame, one arm of the lever being pivotally connected to the other end of the jack, a chain for connecting the other arm of the lever to a tractor mounting the machine, a linkage connecting the bell-crank lever to the bed, conduit means in said hydraulic circuit connecting the hydraulic motor and the hydraulic jack in series so that substantially all the hydraulic fluid passing through said motor passes in turn through said jack, control means for said circuit, means defining a flow path by-passing the jack, a manually operable valve operable to selectively provide said series circuit and direct fluid flow from the motor into the flow path, and a high pressure relief valve for the jack.

References Cited

UNITED STATES PATENTS

| | | | |
|---|---|---|---|
| 2,234,322 | 3/1941 | Sicard | 91—41 X |
| 2,729,041 | 1/1956 | Dunn et al. | 56—25 |
| 2,884,752 | 5/1959 | Martin | 56—25 |

ABRAHAM G. STONE, *Primary Examiner.*

P. A. RAZZANO, *Assistant Examiner.*